US009688255B2

(12) United States Patent
Trapp et al.

(10) Patent No.: US 9,688,255 B2
(45) Date of Patent: Jun. 27, 2017

(54) USING AN ACCELEROMETER TO DETECT TIRE SKID

(71) Applicant: AAI Corporation, Hunt Valley, MD (US)

(72) Inventors: Anne Marie Trapp, Timonium, MD (US); Brandon Reid Hall, Stewartstown, PA (US)

(73) Assignee: AAI Corporation, Hunt Valley, MD (US)

( * ) Notice: Subject to any disclaimer, the term of this patent is extended or adjusted under 35 U.S.C. 154(b) by 43 days.

(21) Appl. No.: 14/747,714

(22) Filed: Jun. 23, 2015

(65) Prior Publication Data

US 2016/0375882 A1    Dec. 29, 2016

(51) Int. Cl.

| B60T 8/1761 | (2006.01) |
|---|---|
| B60T 8/17 | (2006.01) |
| B60T 8/88 | (2006.01) |
| B60T 8/171 | (2006.01) |

(52) U.S. Cl.
CPC .......... B60T 8/17616 (2013.01); B60T 8/171 (2013.01); B60T 8/1703 (2013.01); B60T 8/885 (2013.01); B60T 2270/402 (2013.01)

(58) Field of Classification Search
CPC ......... B64C 25/46; B60T 8/36; B60T 8/1703; B60T 8/17616; B60T 8/885; G06F 7/70; G06F 19/00
See application file for complete search history.

(56) References Cited

U.S. PATENT DOCUMENTS

| 3,804,471 | A | 4/1974 | Fish |
| 4,683,538 | A | 7/1987 | Guichard |
| 5,381,337 | A | 1/1995 | Burgess |
| 5,918,951 | A | 7/1999 | Rudd, III |
| 6,220,676 | B1 | 4/2001 | Rudd, III |
| 6,890,041 | B1 | 5/2005 | Ribbens et al. |
| 7,489,996 | B2 | 2/2009 | Gowan et al. |
| 7,805,233 | B2 | 9/2010 | Gowan et al. |
| 7,938,494 | B2 | 5/2011 | Ribbens et al. |
| 7,991,531 | B2 | 8/2011 | Gowan et al. |
| 8,083,557 | B2 | 12/2011 | Sullivan |
| 8,359,147 | B2 | 1/2013 | Gowan et al. |
| 2007/0038356 | A1* | 2/2007 | Braunberger ........... G06F 19/00 701/70 |
| 2011/0018337 | A1* | 1/2011 | King ..................... B60T 8/1703 303/13 |

* cited by examiner

*Primary Examiner* — Basil T Jos
(74) *Attorney, Agent, or Firm* — BainwoodHuang (57) ABSTRACT

A technique involves operating a vehicle. The technique includes receiving, by processing circuitry, an accelerometer signal from an accelerometer. The technique further includes processing, by the processing circuitry, the accelerometer signal to determine whether the vehicle is currently experiencing tire skid. The technique further includes controlling, by the processing circuitry, the vehicle based on whether the vehicle is currently experiencing tire skid.

20 Claims, 4 Drawing Sheets

USING AN ACCELEROMETER TO DETECT TIRE SKID

BACKGROUND

In order to bring a wheeled vehicle to a stop, a vehicle's braking system converts the kinetic energy of the moving vehicle to heat. This friction is generated when a brake pad or shoe is forced into contact with a brake disc or drum. The friction between the two components will eventually dissipate all of the kinetic energy and the vehicle will come to a complete stop.

Some vehicles are equipped with an anti-lock braking system and wheel speed sensors (e.g., toothed encoders) at each wheel to detect whether application of the brakes causes any of the wheels to skid, i.e., to determine whether a wheel begins sliding over a surface while the vehicle continues moving. If the anti-lock braking system determines that a wheel is skidding, the anti-lock braking system decreases or pulses the brake pressure to allow that wheel to rotate again as the vehicle is slowing.

SUMMARY

Unfortunately, there are deficiencies to the above-described conventional vehicle which uses an anti-lock braking system to prevent skidding. For example, anti-lock braking systems add weight, consume space, and increase vehicle cost. Moreover, in some situations, the complexity, size, and cost requirements for the components of an anti-lock braking system such as wheel speed sensors, harnessing, and a controller may be prohibitive.

In contrast to the above-described conventional vehicle which uses an anti-lock braking system including wheel speed sensors, improved techniques are directed to operating a vehicle and using an accelerometer to detect tire skid. In particular, the accelerometer provides a signal to indicate the vehicle's acceleration or deceleration. A controller assesses the accelerometer signal to determine whether the vehicle is currently experiencing tire skid. Such skid detection techniques do not require elaborate installation of wheel speed sensors, do not consume space around the vehicle's wheels, and do not significantly increase cost. Rather, such techniques may be able to leverage off of existing hardware (e.g., an existing three-axis accelerometer and controller for auto-piloting the vehicle). Additionally, using the accelerometer, the vehicle is able to robustly and reliably detect tire skid and thus improve operation (e.g., reduce tire wear, stop the vehicle in a well-controlled manner, and so on).

One embodiment is directed to a method of controlling a vehicle. The method includes receiving, by processing circuitry, an accelerometer signal from an accelerometer. The method further includes processing, by the processing circuitry, the accelerometer signal to determine whether the vehicle is currently experiencing tire skid. The method further includes controlling, by the processing circuitry, the vehicle based on whether the vehicle is currently experiencing tire skid.

In some arrangements, processing the accelerometer signal includes scanning the accelerometer signal for a tire skid signature, and outputting a skid detection signal having a first value in response to the accelerometer signal not including the tire skid signature and a second value in response to the accelerometer signal including the tire skid signature. The first value indicates that the vehicle currently is not experiencing tire skid. The second value indicates that the vehicle currently is experiencing tire skid.

In some arrangements, the vehicle includes a set of tires. In these arrangements, controlling the vehicle based on whether the vehicle is currently experiencing tire skid includes outputting a control signal to a set of brakes coupled to the set of tires. The control signal directs the set of brakes to apply a first amount of brake pressure when the skid detection signal has the first value, and a second amount of brake pressure when the skid detection signal has the second value. The second amount of brake pressure may be lower than the first amount of brake pressure to allow one or more tires to unlock and to achieve the maximum braking force attainable without causing the vehicle to skid.

In some arrangements, the vehicle further includes an anti-lock braking system which operates as a primary controller of brake pressure. In these arrangements, the method further includes detecting a failure in the primary anti-lock braking system of the vehicle, and utilizing the accelerometer as a backup skid detector in response to the detected failure in the anti-lock braking system. Such a backup skid detector can be used to control brake pressure during a tire skid event. Here, the backup braking hardware is able to take over in the event of a failure of the primary anti-lock braking system.

In some arrangements, outputting the control signal to the set of brakes coupled to the set of tires includes providing the control signal simultaneously to a first brake to control rotation of a first tire and to a second brake to control rotation of a second tire. In other arrangements, the same control signal operates both brakes.

In some arrangements, scanning the accelerometer signal for the tire skid signature includes detecting occurrence of a set of vehicle lurch events (e.g., inconsistent jerk) according to the accelerometer signal. In particular, detecting occurrence of the set of vehicle lurch events according to the accelerometer signal includes recognizing a series of acceleration/deceleration signal spikes (i.e., sharp increases and immediate decreases) in the accelerometer signal, each acceleration/deceleration signal spike exceeding a predefined magnitude threshold.

In some arrangements, the accelerometer includes a 3-axis accelerometer device which measures vehicle acceleration along three different axes. In these arrangements, processing the accelerometer signal to determine whether the vehicle is currently experiencing tire skid includes, based on an electronic signal from the 3-axis accelerometer device, detecting vehicle lurch along a particular axis of the three different axes. The particular axis extends between a front and a back of the vehicle (i.e., the horizontal axis aligned with the aimed or planned direction of the vehicle). Measurements along the other axes are suitable for use as well and for other purposes.

In some arrangements, detecting vehicle lurch along the particular axis of the three different axes occurs while the electronic signal is delivered from the 3-axis accelerometer device to an autopilot circuit of the vehicle. The autopilot circuit uses the electronic signal as input for automatically braking the vehicle.

Another embodiment is directed to a vehicle which has a vehicle body, a set of tires coupled to the vehicle body, and a brake system coupled to the vehicle body and the set of tires. The brake system includes (i) an accelerometer which provides an accelerometer signal, and (ii) a controller which receives the accelerometer signal from the accelerometer, processes the accelerometer signal to determine whether the vehicle is currently experiencing tire skid, and controls the vehicle based on whether the vehicle is currently experiencing tire skid.

Yet another embodiment is directed to a computer program product having a non-transitory computer readable medium which stores a set of instructions to operate a vehicle. The set of instructions, when carried out by processing circuitry, causes the processing circuitry to perform a method of:

(A) receiving an accelerometer signal from an accelerometer;

(B) processing the accelerometer signal to determine whether the vehicle is currently experiencing tire skid; and (C) controlling the vehicle based on whether the vehicle is currently experiencing tire skid.

Other embodiments are directed to electronic systems and apparatus, processing circuits, computer program products, and so on. Some embodiments are directed to various methods, electronic components and circuitry which are involved in detecting tire skid using an accelerometer.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to operating a vehicle and using an accelerometer to detect tire skid (i.e., to identify when a tire is locked in place and/or sliding over a surface). Along these lines, the accelerometer provides an accelerometer signal to indicate the vehicle's current acceleration. A controller assesses the accelerometer signal to determine whether the vehicle is currently experiencing tire skid. Such a skid detection technique does not require elaborate installation of wheel speed sensors, does not consume space around the vehicle's wheels, and does not significantly increase cost. Rather, such a technique may be able to leverage off of existing hardware (e.g., an existing three-axis accelerometer and controller for autopiloting the vehicle). By using the accelerometer signal, the vehicle is able to robustly and reliably detect tire skid and thus improve operation (e.g., reduce tire wear, stop in a controlled manner over a limited surface, and so on).

Figure 1:
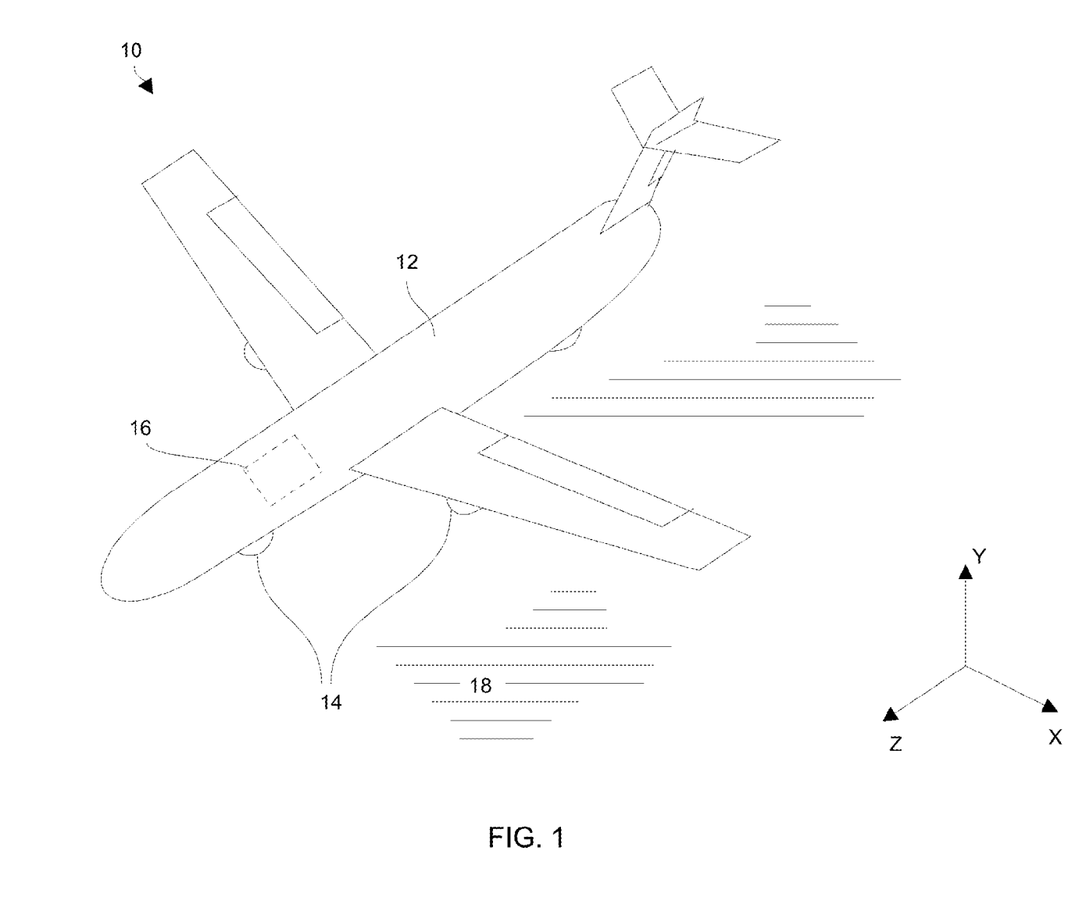
FIG. 1 is a perspective view of an example vehicle which uses an accelerometer to detect tire skid.

FIG. 1 shows an example vehicle 10 which uses an accelerometer to detect tire skid. The vehicle 10 includes a vehicle body 12 (e.g., a chassis, a frame, etc.), a set of tires 14, and a motion control system 16.

The vehicle body 12 is constructed and arranged to support the set of tires 14 and the motion control system 16. The vehicle body 12 may perform other operations as well such as carry cargo/passengers/specialized equipment/etc., fly, float, and so on. In the example of FIG. 1, the vehicle 10 is an unmanned air vehicle (UAV), or drone, and the vehicle body 12 is the UAV's fuselage. However, for other types of vehicles 10, other vehicle bodies 12 are suitable for use (e.g., car bodies for automobiles, chassis for motorcycles, trailers for trucks, etc.).

The set of tires 14 is constructed and arranged to control movement of the vehicle 10 over a surface 18, e.g., to control a UAV while landing on a runway, to control a car while driving over a roadway, etc. In some situations, one or more tires 14 may provide vehicle drive (e.g., propel the vehicle 10 forward), steer the vehicle 10 in a particular direction, cushion and/or support the vehicle 10, and so on. It should be understood that the number of tires 14, the size of each tire 14, the configuration/layout of the tires 14, etc. may vary depending on the particular type, purpose, and design of the vehicle 10.

The motion control system 16 (shown as a block 16 in FIG. 1 for simplicity) is constructed and arranged to control vehicle motion. Examples of such motion control include moving the vehicle 10 forward and/or backward, steering the vehicle 10 in a particular direction, slowing and/or stopping the vehicle 10, and piloting the vehicle 10 through a particular course such as a series of roads, a flight plan, over water, etc.

During vehicle operation, the vehicle 10 travels from one location to another. In order to stop the vehicle 10 at a particular ground location (e.g., a roadway, a landing strip, etc.), a set of brakes of the motion control system 16 applies pressure to the brakes (i.e., to control one or more of the tires 14) to slow the vehicle 10. Eventually, the set of brakes stop the set of tires 14 from rotating, and the vehicle 10 comes to a complete stop.

When pressure is applied to the brakes, an accelerometer of the motion control system 16 continuously provides an accelerometer signal, and an electronic controller of the motion control system 16 continuously analyzes the accelerometer signal to determine whether any of the tires 14 are skidding. If the electronic controller detects a tire skid condition based on the accelerometer signal, the electronic controller can perform one or more remedial activities, e.g., adjust the brake pressure to brake the vehicle 10 more gradually, release the brakes to allow the vehicle 10 to simply roll, etc. Accordingly, a balance may be struck between aggressively slowing the vehicle 10 to minimize braking distance and preventing excessive tire wear. Further details will now be provided with reference to FIG. 2.

Figure 2:
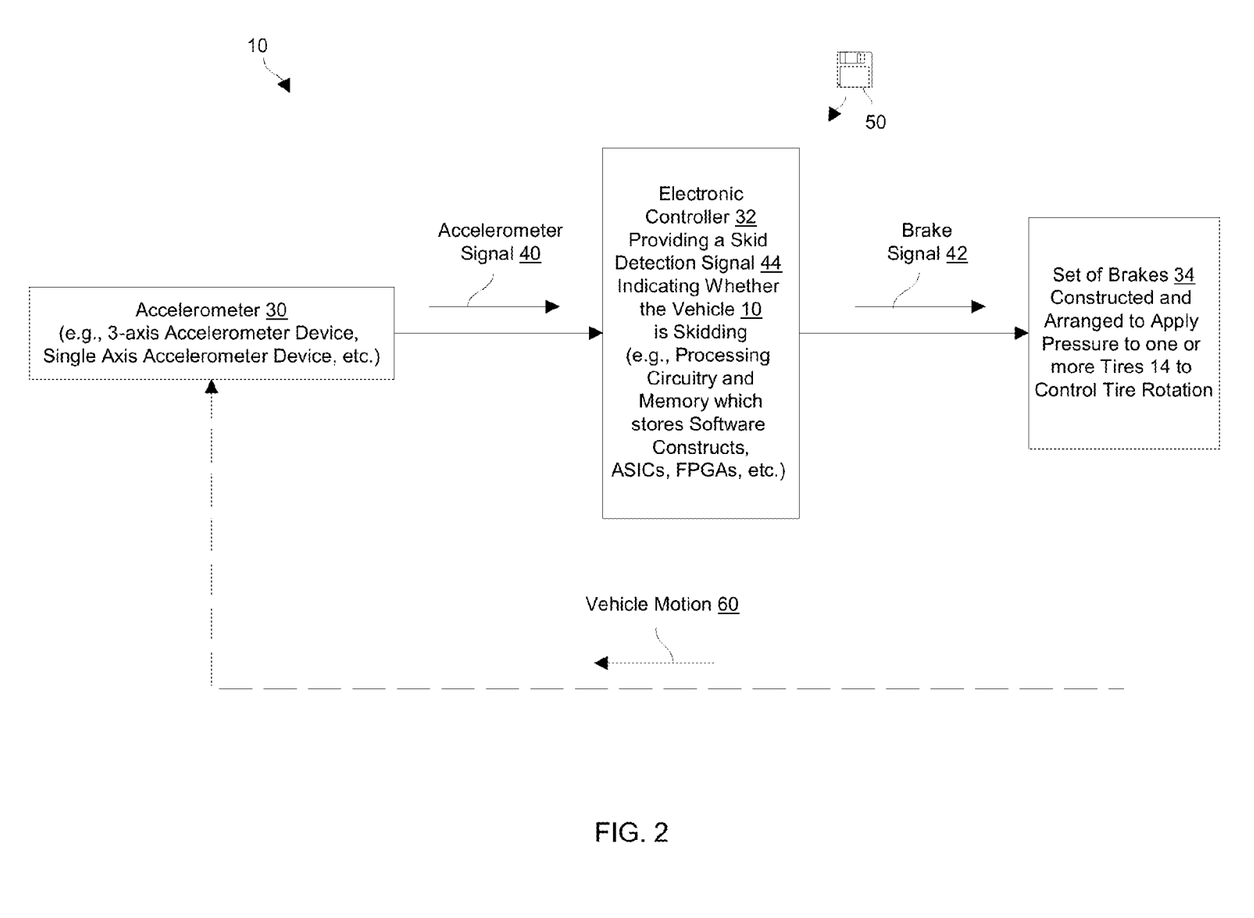
FIG. 2 is a block diagram of particular vehicle components which detect tire skid and control movement of the vehicle.

FIG. 2 shows particular components of the vehicle 10 which are involved in detecting whether a tire 14 is skidding and then controlling vehicle motion. As shown, the particular components include a vehicle accelerometer 30, an electronic controller 32, and a set of brakes 34 (i.e., one or more brakes 34). Such components may be considered generally to belong to the motion control system 16 (also see FIG. 1).

The vehicle accelerometer 30 is constructed and arranged to continuously provide an accelerometer signal 40 which identifies current vehicle acceleration (or deceleration). In some situations, such as for a UAV which is equipped with an autopilot system, the accelerometer 30 may include a 3-axis accelerometer device which identifies acceleration along three different axes (e.g., forward/backward, left/right, and up/down) for additional autopiloting purposes. In other situations, the accelerometer 30 includes a dedicated single axis accelerometer device which identifies whether the vehicle 10 is accelerating longitudinally along the same path as that for the set of tires 14 (e.g., in the forward or backward direction).

The electronic controller 32 is constructed and arranged to assess whether the vehicle 10 is experiencing tire skid based on the accelerometer signal 40 from the accelerometer 30. Along these lines, when the controller 32 is ready to slow the vehicle 10 or bring the vehicle 10 to a complete stop, the controller 32 provides a brake signal 42 to control operation of the set of brakes 34 (i.e., to direct the brakes to apply brake pressure to the brakes). While the controller 32 provides the brake signal 42, the controller 32 assesses vehicle acceleration based on the acceleration signal 40 to determine whether the vehicle 10 is experiencing tire skid. Further details of such assessment will be provided shortly.

It should be understood that the controller 32 may be dedicated to detecting tire skid and operating the set of brakes 34. Alternatively, the controller 32 may belong to a larger control system of the vehicle 10. For example, the controller 32 may perform other activities such as autopilot operations (e.g., automated control of steering, vehicle speed, altitude, etc.), subsystem control (e.g., engine/propulsion control, fuel monitoring and management, payload deployment, etc.), information processing (e.g., data collection, surveillance, communications, etc.), and so on.

It should be further understood that the above-mentioned controller 32 may be implemented in a variety of ways including via one or more processors (or cores) and memory storing specialized software, application specific ICs (ASICs), field programmable gate arrays (FPGAs) and associated programs, discrete components, analog circuits, other hardware circuitry, combinations thereof, and so on. In the context of one or more processors executing software from memory, a computer program product 50 is capable of delivering all or portions of the software to the controller 32. The computer program product 50 has a non-transitory and non-volatile computer readable medium which stores a set of instructions to control one or more operations of the controller 32 (e.g., tire skid detection and brake control). Examples of suitable computer readable storage media include tangible articles of manufacture and apparatus which store instructions in a non-volatile manner such as CD-ROM, flash memory, disk memory, tape memory, and the like.

The set of brakes 34 is constructed and arranged to slow the rotation of one or more of the tires 14 and to slow and/or stop the vehicle 10 in response to the brake signal 42. To this end, the set of brakes 34 reduces the rotational speed of the tires 14 (i.e., to one or more of the tires 14). A variety of different brake designs are suitable for use (e.g., disk brakes, drum brakes, other caliper/rotor configurations, combinations thereof, etc.).

During operation, the vehicle 10 travels from one location to another. In order to stop the vehicle 10 at a particular ground location (e.g., a landing strip or a roadway), the controller 32 operates the set of brakes 34 to slow the vehicle 10 and bring the vehicle 10 to a complete stop. In particular, the controller 32 outputs the brake signal 42 to the set of brakes 34 directing the set of brakes 34 to apply pressure to the brake system. Eventually, the set of brakes 34 stops the set of tires 14 from rotating, and the vehicle 10 comes to a complete stop.

While the set of brakes 34 apply pressure to the brakes, the accelerometer 30 continuously provides the accelerometer signal 40, and the electronic controller 32 continuously analyzes the accelerometer signal 40 to determine whether any of the tires 14 are skidding (i.e., sliding on the ground).

If the electronic controller 32 detects a tire skid condition based on the accelerometer signal 40, the electronic controller 32 can perform one or more remedial activities, e.g., adjust the brake pressure to brake the vehicle 10 more gradually, release the brakes 34 completely to allow the tires 14 to more easily roll, etc. Here, the controller 32 scans the accelerometer signal 40 for a tire skid signature, and outputs a skid detection signal 44 having a first value (e.g., de-asserted) in response to the accelerometer signal 40 not including the tire skid signature and a second value (e.g., asserted) in response to the accelerometer signal 40 including the tire skid signature. The skid detection signal 44 can then be used to control operation of the vehicle 10 (e.g., to release the brakes 34, to decrease brake pressure, etc.). Accordingly, a desired balance may be struck between aggressively slowing the vehicle 10 to minimize braking distance and preventing excessive tire wear.

It should be understood that the accelerometer 30 provides the acceleration signal 40 continuously so that the vehicle motion response 60 (see dashed line 60 in FIG. 2) is sensed by the accelerometer 30 in the form of a feedback loop. As a result, the controller 32 is able to precisely adjust the brake signal 42 based on the skid detection signal 44 (e.g., increase brake pressure with no skidding, decrease brake pressure at first sign of skidding, etc.) which in turn is based on current vehicle motion 60 detected by the accelerometer 30.

In the UAV example (also see FIG. 1) where perhaps landing space is limited, such a system is well-suited to maintaining maximum braking force in order to achieve minimal stopping distance. In particular, to stop the UAV during landing, the set of brakes 34 may apply gradually increasing brake pressure to land the UAV over a minimal landing surface. If the controller 32 determines that one or more of the tires 14 is skidding, the controller 32 adjusts the brake signal 42 so that the set of brakes 34 applies less pressure thus allowing the skidding tire or tires 14 to rotate again but nevertheless bring the UAV to a complete stop under maximum braking force.

It should be understood that other use cases are suitable as well. For example, suppose that the vehicle 10 is an automobile with an anti-lock braking system (ABS). In this situation, the accelerometer 30 and the controller 32 may form a backup or emergency braking system which activates in the event of an ABS failure (e.g., where the controller 32 monitors the ABS system, detects a failure in the ABS, and imposes brake control redundancy to stop the vehicle 10). Further details will now be provided with reference to FIG. 3.

Figure 3:
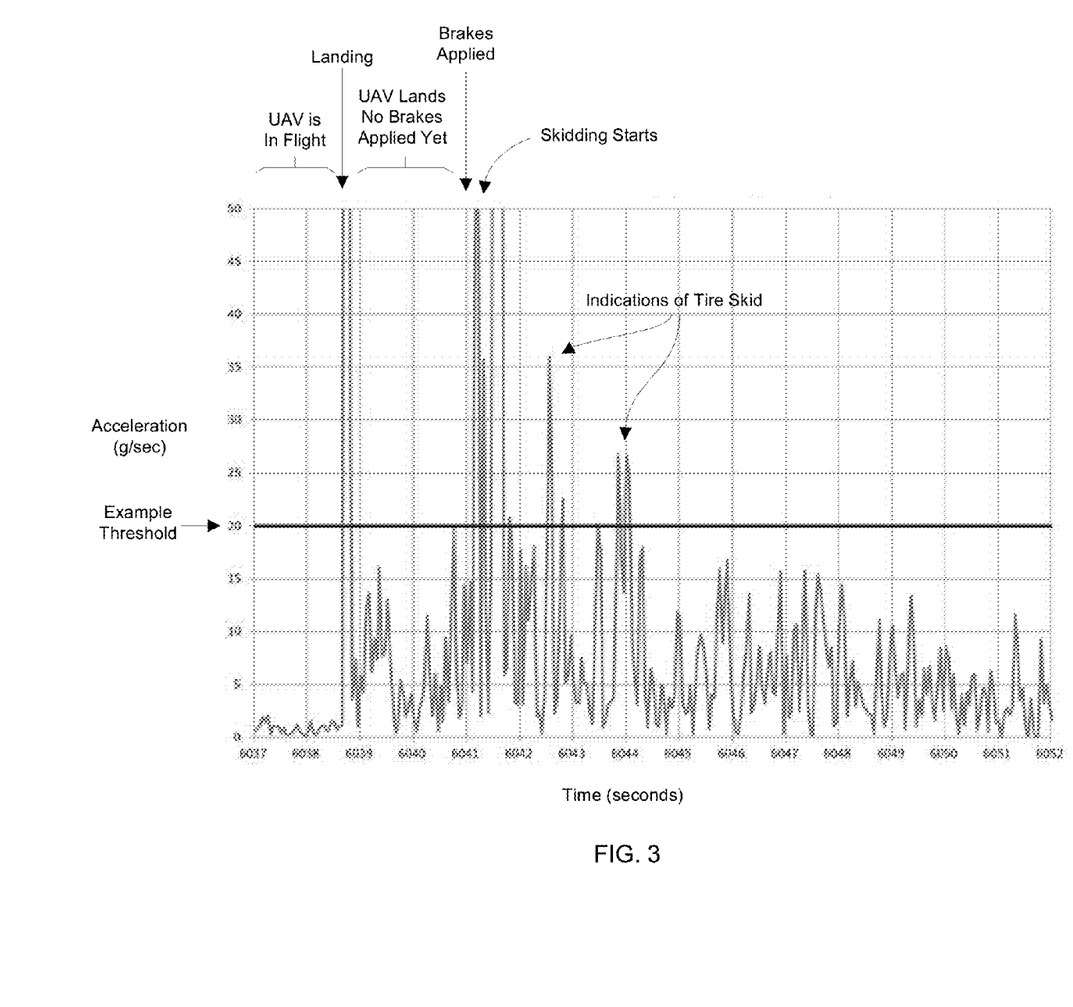
FIG. 3 is a graphical illustration of an accelerometer signal of a vehicle accelerometer during vehicle landing with tire skid.

FIG. 3 graphically illustrates the accelerometer signal 40 from the vehicle accelerometer 30 in the context of a landing UAV. In particular, FIG. 3 is a graphical illustration of the accelerometer signal 40 during a UAV landing with tire skid.

It should be understood that different types of vehicles 10 and different vehicle designs/configurations will provide different accelerometer signatures which characterize tire skid. In the context of the UAV example of FIG. 1, the UAV is considered to be in a skid when vehicle lurching/jerk exists which exceeds a predefined threshold of 20 g/sec. Such vehicle lurching results in excessive signal spikes in the accelerometer signal 40.

Of course, other signal characteristics will define other types of vehicles and other vehicle designs/configurations. Along these lines, the controller 32 can be easily programmed/configured to detect particular acceleration signal patterns which characterize tire skid for that vehicle 10 (e.g., by setting or adjusting a predefine threshold, by scanning for steepness in signal waveforms, by identifying other types of waveform shapes/curves/etc., combinations thereof, and so on).

As shown in FIG. 3, the UAV is in flight through timestamps 6037 and 6038 with no lurching (i.e., minimal turbulence) in the longitudinal direction. Just prior to timestamp 6039, the UAV lands and coasts without braking. Around timestamp 6041, the UAV applies its brakes 34 and skidding starts immediately. Skidding continues through timestamp 6044 while the brake pressure is maintained or increased since there is no skid detection implemented (i.e., approximately three seconds of skidding) before the skidding finally subsides. Unfortunately, such skidding results in excessive tire wear as well as places undue stresses on certain parts of the vehicle 10.

Figure 4:
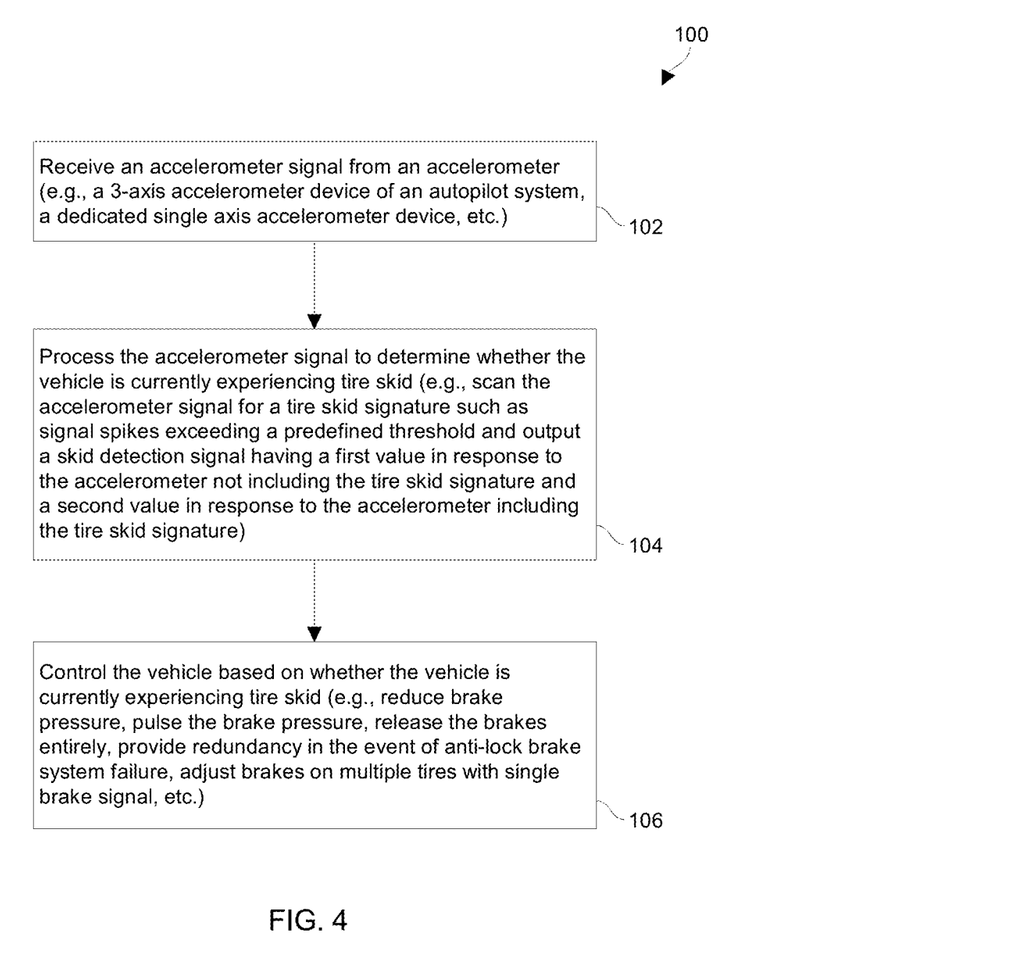
FIG. 4 is a flowchart of a procedure which is performed using an accelerometer to detect tire skid.

FIG. 4 is a flowchart of a procedure 100 which is performed by processing circuitry of the vehicle 10 to operate the vehicle 10 (also see the controller 32 of FIG. 2). It should be understood that the processing circuitry may be dedicated to detecting tire skid based on input from an accelerometer or perform other operations as well (e.g., autopilot operations, etc.).

At 102, the processing circuitry receives an accelerometer signal from an accelerometer. In some arrangements, the accelerometer includes a 3-axis acceleration detection device to measure acceleration in three different axes (e.g., see the X, Y and Z axes in FIG. 1). In other arrangements, the accelerometer includes a dedicated single axis accelerometer device to detect acceleration only in one direction.

At 104, the processing circuitry processes the accelerometer signal 40 to determine whether the vehicle 10 is currently experiencing tire skid. In some arrangements, the processing circuitry scans the accelerometer signal for a tire skid signature (e.g., see FIGS. 3 and 4), and outputs a skid detection signal having a first value in response to the accelerometer signal not including the tire skid signature and a second value in response to the accelerometer signal including the tire skid signature. It should be understood that the tire skid signature may vary depending on the type and design/configuration of the vehicle 10. Nevertheless, the processing circuitry can be easily programmed/configured to detect the particular signature (or signal pattern) characterizing tire skid for that vehicle 10 (e.g., by setting or adjusting a predefine threshold, by scanning for steepness in signal spikes, by detecting other types of waveform patterns, combinations thereof, and so on).

At 106, the processing circuitry controls the vehicle 10 based on whether the vehicle 10 is currently experiencing tire skid. For example, the processing circuitry may gradually decrease brake pressure until the locked tires 14 begin rolling again, or outright release the brakes 34 completely. In some arrangements, the processing circuitry provides the braking signal for redundancy in the event that an ABS operating as the primary braking system fails.

As described above, improved techniques are directed to operating a vehicle 10 and using an accelerometer 30 to detect tire skid. In particular, the accelerometer 30 provides an accelerometer signal 40 to indicate the vehicle's acceleration (or deceleration). An electronic controller 32 assesses the accelerometer signal 40 to determine whether the vehicle 10 is currently experiencing tire skid. Such skid detection techniques do not require elaborate installation of wheel speed sensors, do not consume space around the vehicle's wheels, and do not significantly increase cost. Rather, such techniques may be able to leverage off of existing hardware (e.g., an existing three-axis accelerometer and an electronic controller for autopiloting the vehicle 10).

Additionally, using the accelerometer 30, the vehicle 10 is able to robustly and reliably detect tire skid and thus improve operation (e.g., reduce tire wear, stop in a controlled manner over a limited surface, and so on).

While various embodiments of the present disclosure have been particularly shown and described, it will be understood by those skilled in the art that various changes in form and details may be made therein without departing from the spirit and scope of the present disclosure as defined by the appended claims. Such modifications and enhancements are intended to belong to various embodiments of the disclosure.

What is claimed is:

1. A method of operating a vehicle, the method comprising:
   receiving, by processing circuitry, an accelerometer signal from an accelerometer,
   processing, by the processing circuitry, the accelerometer signal to determine whether the vehicle is currently experiencing tire skid, and
   controlling, by the processing circuitry, the vehicle based on whether the vehicle is currently experiencing tire skid; and
   wherein processing the accelerometer signal includes:
      scanning the accelerometer signal for a tire skid signature, and outputting a skid detection signal having a first value in response to the accelerometer signal not including the tire skid signature and a second value in response to the accelerometer signal including the tire skid signature.

2. The method as in claim 1 wherein the vehicle includes a set of tires; and
   wherein controlling the vehicle based on whether the vehicle is currently experiencing tire skid includes:
      outputting a control signal to a set of brakes coupled to the set of tires, the control signal directing the set of brakes to apply a first amount of brake pressure when the skid detection signal has the first value, and a second amount of brake pressure when the skid detection signal has the second value, the second amount of brake pressure being lower than the first amount of brake pressure.

3. The method as in claim 2 wherein the vehicle further includes an anti-lock braking system which operates as a primary controller of brake pressure during a skid event to the set of tires; and
   wherein the method further comprises:
      detecting a failure in the anti-lock braking system of the vehicle, and activating backup braking hardware in response to the detected failure in the anti-lock braking system, the backup braking hardware being enabled to control brake pressure upon activation.

4. The method as in claim 2 wherein outputting the control signal to the set of brakes coupled to the set of tires includes:
   providing the control signal simultaneously to a first brake to control rotation of a first tire and to a second brake to control rotation of a second tire.

5. The method as in claim 1 wherein scanning the accelerometer signal for the tire skid signature includes:
   detecting occurrence of a set of vehicle lurch events according to the accelerometer signal.

6. The method as in claim 5 wherein detecting occurrence of the set of vehicle lurch events according to the accelerometer signal includes:

recognizing a series of acceleration/deceleration signal spikes in the accelerometer signal, each acceleration/deceleration signal spike exceeding a predefined magnitude threshold.

7. A method of operating a vehicle, the method comprising:
   receiving, by processing circuitry, an accelerometer signal from an accelerometer,
   processing, by the processing circuitry, the accelerometer signal to determine whether the vehicle is currently experiencing tire skid, and
   controlling, by the processing circuitry, the vehicle based on whether the vehicle is currently experiencing tire skid; and
wherein the accelerometer includes a 3-axis accelerometer device which measures vehicle acceleration along three different axes; and
wherein processing the accelerometer signal to determine whether the vehicle is currently experiencing tire skid includes:
   based on an electronic signal from the 3-axis accelerometer device, detecting vehicle lurch along a particular axis of the three different axes, the particular axis extending between a front and a back of the vehicle.

8. The method as in claim 7 wherein detecting vehicle lurch along the particular axis of the three different axes occurs while the electronic signal is delivered from the 3-axis accelerometer device to an autopilot circuit of the vehicle, the autopilot circuit using the electronic signal as input for automatically piloting the vehicle.

9. A vehicle, comprising:
   a vehicle body;
   a set of tires coupled to the vehicle body; and
   a brake system coupled to the vehicle body and the set of tires, the brake system including:
      an accelerometer which provides an accelerometer signal, and
      a controller which receives the accelerometer signal from the accelerometer, processes the accelerometer signal to determine whether the vehicle is currently experiencing tire skid, and controls the vehicle based on whether the vehicle is currently experiencing tire skid; and
wherein the controller, when processing the accelerometer signal, is constructed and arranged to:
   scan the accelerometer signal for a tire skid signature, and output a skid detection signal having a first value in response to the accelerometer signal not including the tire skid signature and a second value in response to the accelerometer signal including the tire skid signature.

10. The vehicle as in claim 9 wherein the controller, when controlling the vehicle based on whether the vehicle is currently experiencing tire skid, is constructed and arranged to:
   output a control signal to a set of brakes coupled to the set of tires, the control signal directing the set of brakes to apply a first amount of brake pressure when the skid detection signal has the first value, and a second amount of brake pressure when the skid detection signal has the second value, the second amount of brake pressure being lower than the first amount of brake pressure.

11. The vehicle as in claim 10 wherein the brake system further includes (i) an anti-lock braking system which operates as a primary controller of brake pressure and (ii) backup skid detection circuitry which is different from the anti-lock braking system; and wherein the controller is further constructed and arranged to:
   detect a failure in the anti-lock braking system of the vehicle, and activating the backup skid detection circuitry in response to the detected failure in the anti-lock braking system, the backup skid detection circuitry being enabled to control brake pressure upon activation.

12. The vehicle as in claim 10 wherein the controller, when outputting the control signal to the set of brakes coupled to the set of tires, is constructed and arranged to:
   provide the control signal concurrently to a first brake to control rotation of a first tire and to a second brake to control rotation of a second tire.

13. The vehicle as in claim 9 wherein controller, when scanning the accelerometer signal for the tire skid signature, is constructed and arranged to:
   detect occurrence of a set of vehicle lurch events according to the accelerometer signal.

14. The vehicle as in claim 13 wherein the controller, when detecting occurrence of the set of vehicle lurch events according to the accelerometer signal, is constructed and arranged to:
   recognize a series of acceleration/deceleration signal spikes in the accelerometer signal, each acceleration/deceleration signal spike exceeding a predefined magnitude threshold.

15. A vehicle, comprising:
   a vehicle body;
   a set of tires coupled to the vehicle body; and
   a brake system coupled to the vehicle body and the set of tires, the brake system including:
      an accelerometer which provides an accelerometer signal, and
      a controller which receives the accelerometer signal from the accelerometer, processes the accelerometer signal to determine whether the vehicle is currently experiencing tire skid, and controls the vehicle based on whether the vehicle is currently experiencing tire skid; and
wherein the accelerometer includes a 3-axis accelerometer device which measures vehicle acceleration along three different axes; and
wherein the controller, when processing the accelerometer signal to determine whether the vehicle is currently experiencing tire skid, is constructed and arranged to:
   based on an electronic signal from the 3-axis accelerometer device, detecting vehicle lurch along a particular axis of the three different axes, the particular axis extending between a front and a back of the vehicle.

16. The vehicle as in claim 15 wherein the controller is constructed and arranged to detect vehicle lurch along the particular axis of the three different axes while the electronic signal is delivered from the 3-axis accelerometer device to an autopilot circuit of the vehicle, the autopilot circuit using the electronic signal as input for automatically piloting the vehicle.

17. A computer program product having a non-transitory computer readable medium which stores a set of instructions to operate a vehicle, the set of instructions, when carried out by processing circuitry, causing the processing circuitry to perform a method of:
   receiving an accelerometer signal from an accelerometer,
   processing the accelerometer signal to determine whether the vehicle is currently experiencing tire skid, and
   controlling the vehicle based on whether the vehicle is currently experiencing tire skid; and wherein controlling the vehicle based on whether the vehicle is currently experiencing tire skid includes:

providing a control signal simultaneously to each of a first brake proximate to a first tire and a second brake proximate to a second tire to concurrently control rotation of the first and second tires using the control signal.

18. The computer program product as in claim 17 wherein processing the accelerometer signal includes:

scanning the accelerometer signal for a tire skid signature, and outputting a skid detection signal having a first value in response to the accelerometer signal not including the tire skid signature and a second value in response to the accelerometer signal including the tire skid signature.

19. The computer program product as in claim 17 wherein the accelerometer includes a 3-axis accelerometer device which measures vehicle acceleration along three different axes; and wherein processing the accelerometer signal to determine whether the vehicle is currently experiencing tire skid includes:

based on an electronic signal from the 3-axis accelerometer device, detecting vehicle lurch along a particular axis of the three different axes, the particular axis extending between a front and a back of the vehicle.

20. A method of operating a vehicle, the method comprising:

receiving, by processing circuitry, an accelerometer signal from an accelerometer, processing, by the processing circuitry, the accelerometer signal to determine whether the vehicle is currently experiencing tire skid, and controlling, by the processing circuitry, the vehicle based on whether the vehicle is currently experiencing tire skid; and wherein controlling the vehicle based on whether the vehicle is currently experiencing tire skid includes:

providing a control signal simultaneously to each of a first brake proximate to a first tire and a second brake proximate to a second tire to concurrently control rotation of the first and second tires using the control signal.

* * * * *